United States Patent
Dufour

(10) Patent No.: US 10,370,797 B2
(45) Date of Patent: Aug. 6, 2019

(54) CELLULOSIC FIBER-BASED SUBSTRATE, METHOD OF PRODUCTION AND USE AS A SUBSTRATE FOR ADHESIVE TAPES

(71) Applicant: AHLSTROM CORPORATION, Helsinki (FI)

(72) Inventor: Menno Dufour, Lyons (FR)

(73) Assignee: Ahlstrom Corporation, Helsinki (FI)

( * ) Notice: Subject to any disclaimer, the term of this patent is extended or adjusted under 35 U.S.C. 154(b) by 0 days.

(21) Appl. No.: 15/514,210

(22) PCT Filed: Sep. 25, 2015

(86) PCT No.: PCT/EP2015/072134
§ 371 (c)(1),
(2) Date: Mar. 24, 2017

(87) PCT Pub. No.: WO2016/046379
PCT Pub. Date: Mar. 31, 2016

(65) Prior Publication Data
US 2017/0292044 A1    Oct. 12, 2017

(30) Foreign Application Priority Data
Sep. 26, 2014    (FR) .................................. 14 59115

(51) Int. Cl.
| | | |
|---|---|---|
| D21H 23/24 | (2006.01) | |
| D21H 19/20 | (2006.01) | |
| D21H 19/24 | (2006.01) | |
| D21H 19/32 | (2006.01) | |
| D21H 19/12 | (2006.01) | |
| D21H 19/34 | (2006.01) | |
| C09J 7/20 | (2018.01) | |
| C09J 7/21 | (2018.01) | |

(52) U.S. Cl.
CPC .............. D21H 23/24 (2013.01); C09J 7/201 (2018.01); C09J 7/21 (2018.01); D21H 19/12 (2013.01); D21H 19/20 (2013.01); D21H 19/24 (2013.01); D21H 19/32 (2013.01); D21H 19/34 (2013.01); C09J 2203/31 (2013.01); C09J 2400/283 (2013.01)

(58) Field of Classification Search
CPC .......... D21H 9/12; D21H 19/20; D21H 19/24; D21H 27/001; D21H 19/32; D21H 19/34; D21H 23/24; C09J 183/04; C09J 2400/283; C09J 2203/31; C09J 2203/334; C09J 7/38; C09J 7/401; C09J 7/21; C09J 7/201; Y10T 428/31663; Y10T 428/1476; Y10T 428/2852; C09D 183/04; C09D 157/00
See application file for complete search history.

(56) References Cited

U.S. PATENT DOCUMENTS

| | | | | |
|---|---|---|---|---|
| 2,814,601 A | * | 11/1957 | Currie | C09J 183/04 528/18 |
| 3,475,267 A | * | 10/1969 | Miles | B32B 27/00 156/334 |
| 4,190,688 A | * | 2/1980 | Traver | C08L 83/04 427/391 |
| 5,318,815 A | * | 6/1994 | Newing | C09D 157/00 428/40.9 |
| 5,576,110 A | * | 11/1996 | Lin | C09J 183/04 428/447 |
| 5,662,985 A | * | 9/1997 | Jensen | B32B 27/08 428/195.1 |
| 6,093,782 A | * | 7/2000 | Herzig | C08G 77/12 525/478 |
| 6,806,339 B2 | * | 10/2004 | Cray | C08G 77/04 524/588 |
| 9,803,321 B2 | * | 10/2017 | Fantini | D21H 19/12 |
| 2002/0061998 A1 | * | 5/2002 | Cray | C08G 77/04 528/32 |
| 2007/0004859 A1 | | 1/2007 | Bacher et al. | |
| 2012/0082818 A1 | * | 4/2012 | Wada | C09J 7/401 428/41.8 |
| 2013/0040134 A1 | * | 2/2013 | Dufour | D21H 19/20 428/342 |
| 2013/0101840 A1 | * | 4/2013 | Yang | C07C 267/00 428/345 |
| 2017/0145256 A1 | * | 5/2017 | Huang | C09D 183/04 |
| 2017/0284027 A1 | * | 10/2017 | Fantini | D21H 19/12 |
| 2017/0292043 A1 | * | 10/2017 | Dufour | C09J 7/041 |
| 2017/0292044 A1 | * | 10/2017 | Dufour | C09J 7/046 |

FOREIGN PATENT DOCUMENTS

| | | | | |
|---|---|---|---|---|
| EP | 0924275 A1 | * | 6/1999 | ............ C08G 77/12 |
| FR | 2865482 A1 | * | 7/2005 | ........... D06M 13/207 |
| FR | 2 956 671 | | 8/2011 | |
| WO | WO-8912549 A1 | * | 12/1989 | ........... C09D 157/00 |
| WO | WO-2005071161 A1 | * | 8/2005 | ........... D06M 13/207 |

OTHER PUBLICATIONS

International Search Report for PCT/EP2015/072134, dated Nov. 4, 2015, 3 pages.
Written Opinion of the ISA for PCT/EP2015/072134, dated Nov. 4, 2015, 4 pages.

\* cited by examiner

Primary Examiner — Jose A Fortuna
(74) Attorney, Agent, or Firm — Seppo Laine Oy

(57) ABSTRACT

A cellulosic fiber-based adhesive tape substrate, at least one side of which is coated with an aqueous mixture of: a) at least one organic polymer having pendant groups with at least one vinyl function; b) at least one polysiloxane comprising at least one hydrogenosiloxane monomer —(O—SiR$^1$H)—, wherein R$^1$ is a linear or branched and/or cyclic hydrocarbon chain which may contain heteroatoms; c) at least one hydrosilylation catalyst.

14 Claims, No Drawings

CELLULOSIC FIBER-BASED SUBSTRATE, METHOD OF PRODUCTION AND USE AS A SUBSTRATE FOR ADHESIVE TAPES

This application is the U.S. national phase of International Application No. PCT/EP2015/072134 filed 25 Sep. 2015, which designated the U.S. and claims priority to FR Patent Application No. 1459115 filed 26 Sep. 2014, the entire contents of each of which are hereby incorporated by reference.

FIELD OF THE INVENTION

The invention relates to a new cellulosic fiber-based substrate, as well as the production method thereof.

The field of use of the invention is the adhesive tape industry. According to one particular embodiment, the invention relates to crepe paper to be used as a substrate for adhesive tapes, particularly masking tapes used in painting. Nevertheless, a flat back paper may also be used instead of crepe paper as a substrate for adhesive tapes.

DESCRIPTION OF THE PRIOR ART

Adhesive tapes generally consist of a fibrous substrate, notably crepe paper, to which an adhesive layer is applied on at least one side.

These adhesive tapes have applications in various areas, notably in painting, packaging, insulation, coating, electronic industry, automotive and aerospace industry, repairs, etc.

Crepe paper is characterized generally by low basis weight, significant elongation rate and specific flexibility, porosity and thickness. These features depend on a number of parameters linked to the papermaking steps, notably the creping step.

In practice, the crepe paper has a basis weight between 32 and 80 g/m$^2$, and preferably around 39 g/m$^2$. The elongation of the crepe paper is from 4 to 20% in the machine direction, or more for certain applications (masking tape for curves).

The production of crepe paper is primarily composed of at least two conventional steps, namely:
the forming of the sheet,
the pressing.

When the creping is made after the pressing, the process is named "wet creping".

It is possible not to crepe directly after the pressing. In that case, the step of pressing is followed by a step of drying and the creping is made after. Such a process is named "dry creping".

The invention is concerned by both processes.

The pressing and drying steps may notably be performed on a single drying cylinder (e.g. a Yankee cylinder). When it exits the cylinder, the sheet is creped using special scrapers, prior to being wound.

Generally, the production of masking tape occurs in three steps.

In the first step, the crepe paper constituting the substrate is saturated by impregnation with a binder or latex, typically an SBR-type latex (for example, 10 to 20 g/m$^2$ SBR (Styrene-Butadiene Rubber) latex). This first saturation step enables:
improve the physical properties of the substrate to allow further processing;
the creation of a barrier to prevent the migration of the adhesive into the paper;
ensure good cohesion with the release agent and the adhesive to prevent delamination.

The second step consists of coating one side of the crepe paper saturated by treatment with a release agent (for example, 4 g/m$^2$ of acrylic latex).

Lastly, the third step consists of applying the adhesive on the second side of the crepe paper (generally between 30 and 40 g/m$^2$) to form the final masking tape. The treatment in the third step allows the tape to be packaged in roll form while facilitating its unwinding by the user.

In practice, the adhesive tape manufacturer procures the crepe paper from a paper manufacturer. The manufacturer saturates the paper and coats it with a release layer on at least one side. They lastly apply the adhesive layer in order to obtain a tape. The whole process therefore requires four distinct steps. Furthermore, the production and subsequent treatment of the paper do not occur inline, which obviously affects the cost. In addition, the step of saturating the crepe paper with binders may prove to be incomplete or inhomogeneous when performed offline. This results in an imperfectly sealed tape with respect to paint. Masking tapes often pose the problem of minute paint leakage along the lateral edges of the tape, thereby producing a dividing line and imperfect masking.

To overcome all these drawbacks, the Applicant has developed a new cellulosic fiber-based tape substrate, notably crepe paper, requiring a limited number of production steps.

Moreover, the substrate has the advantage of being ready to be coated by the adhesive tape manufacturer with an adhesive.

DISCLOSURE OF THE INVENTION

The object of the invention is a cellulosic fiber-based adhesive tape substrate, notably crepe paper, but also flat back paper as well as its method of production and use as a substrate in the production of adhesive tapes, specifically masking tapes.

The present invention enables the obtainment of crepe paper or flat back paper for masking tapes, which:
notably has at least the same release and dry and wet strength properties as a saturated crepe or flat back paper coated on at least one side with a release layer and prepared in a conventional manner.
is prepared continuously in a single production line.
after an adhesive is applied it provides of a masking tape with peeling properties and a degree of tack that is compliant with manufacturing standards.

In practice, the invention involves treating by coating at least one side of the substrate with an aqueous composition containing an organic polymer and an inorganic polymer (i.e., silicone), said composition acting as both a saturation agent and a release agent.

More specifically, the object of the invention is a cellulosic fiber-based adhesive tape substrate, at least one side of which is directly coated with a single layer containing an aqueous mixture comprising:
at least one organic polymer comprising pendant groups with at least one vinyl function;
at least one polysiloxane comprising at least one hydrogen siloxane monomer —(O—SiR$^1$H)—, wherein R$^1$ is a linear or branched and/or cyclic hydrocarbon chain which may contain heteroatoms;
and at least one hydrosilylation catalyst.

The vinyl groups of the organic polymer may react, notably by hydrosilylation, with the Si—H functional groups of the polysiloxane, in the presence of an appropriate catalyst. The polysiloxane may thus act as a crosslinking agent.

Advantageously, the release properties conferred to the substrate may be modulated by varying in parallel the number of vinyl functional groups on the organic polymer and the amount of polysiloxane added to the composition.

In practice, the ratio of Si—H of the polysiloxane to the vinyl functional group of the organic polymer is between 1 and 5, preferably between 1 and 3, and more preferably between 1.5 and 2. Likewise, the catalyst level is between 30 and 200 ppm, preferably between 50 and 150 ppm, and more preferably between 80 and 120 ppm.

WO2010/141277 also describes a crepe paper substrate coated with a water-soluble organic polymer, in this case PVA. Nevertheless, prior to coating, the substrate is treated with glyoxal which enables the crosslinking and retention of PVA on the substrate. PVA does not comprise any pendant groups with at least one vinyl function. This treatment does not confer release properties to the substrate.

WO2011/104427A1 describes a glassine paper, one side of which is coated with a layer formed by a PVA grafted with an undecylenic aldehyde. The paper is then treated by siliconization offline. In order to do this, the paper coated with a first layer of grafted PVA is treated with a second layer consisting of a mixture comprising a silicone-based crosslinking agent with Si—H functions and a linear PDMS inorganic polymer with terminal vinyl groups, in the presence of a platinum catalyst.

Generally, the cellulosic fiber-based substrate comprises cellulosic fibers in proportions ranging from 80 and 99% by weight. Advantageously, the refining of the fibers ranges from 20 and 50° SR, preferably from 30 to 40° SR.

According to the invention, the organic polymer is a water-soluble organic polymer (WSP) which may be obtained from polymers comprising:
  hydroxyl functions and/or primary and/or secondary amine functions, at least some of which were made to react beforehand by acetylation and/or hemiacetylation with at least one organic molecule (OM1) having at least one aldehyde function and at least one vinyl function, and/or
  hydroxyl functions and/or primary and/or secondary amine functions, at least some of which were made to react beforehand with at least one organic molecule (OM2) comprising at least one epoxy function and at least one vinyl function.

Advantageously, said water-soluble organic polymer is selected from the group comprising: polyvinyl alcohol (PVA); starch; alginate; carboxymethylcellulose (CMC); hydrolyzed or partially hydrolyzed copolymers of vinyl acetate, which may be obtained, for example, by the hydrolysis of ethylene—vinyl acetate (EVA), or vinyl chloride—vinyl acetate, N-vinylpyrrolidone—vinyl acetate, and maleic anhydride—vinyl acetate; polyethyleneimine; polyallylamine; chitosan; polyacrylamide; partially or fully hydrolyzed polyacrylamide; partially or fully hydrolyzed polyvinylamine; aminoethylpiperazine-based polyamines.

Still more advantageously, said water-soluble organic polymer is PVA of molecular weight preferably between 5,000 and 1,000,000 g/mol, advantageously between 10,000 and 150,000 g/mol.

Preferably, the organic molecule OM1 has the following formula: HCO—(R)—CH=CH$_2$, wherein R=a linear or branched and/or cyclic carbon chain which may contain heteroatoms.

The organic molecule (OM1) is preferably undecylenic aldehyde with the formula HCO—(C$_8$H$_{16}$)—CH=CH$_2$.

Preferably, the organic molecule (OM2) has the following formula H$_2$C—O—CH—(R$^3$)—CH=CH$_2$, wherein R$^3$ is a linear, branched and/or cyclic hydrocarbon chain —(C)$_x$— which may contain at least one heteroatom (X).

In a third embodiment of the invention, the organic polymer is an organic polymer in aqueous dispersion (AD) comprising pendant groups having at least one vinyl function. It may notably be selected from the group comprising butadiene-based latexes. Such latexes are notably described in the book: Les Latex Synthetiques, J. C. Daniel & C. Pichot, Lavoisier 2006, p. 420-421.

Furthermore, the vinyl functions of the organic polymers are able to react by hydrosilylation with the Si—H functions of the polysiloxane, which acts as a crosslinking agent in the presence of a catalyst, once in an aqueous medium.

The hydrosilylation reaction is known to those skilled in the art. It is generally catalyzed by an appropriate catalyst, for example a platinum catalyst.

In an advantageous embodiment of the invention, the polysiloxane has at least one hydrogen siloxane monomer —(O—SiR$^1$H)—, wherein R$^1$ is a linear or branched and/or cyclic hydrocarbon chain which may contain heteroatoms.

Even more advantageously, the polysiloxane is selected from the group comprising: polyhydrogenomethylsiloxane (PHMS) with the formula CH$_3$—(O—SiCH$_3$H)$_n$—CH$_3$ (wherein n is between 10 and 150); poly(hydrogenomethyl-co-dimethyl)siloxane (PHDMS) copolymer with the formula CH$_3$—(O—Si(CH$_3$)$_2$)$_m$—(O—SiCH$_3$H)$_n$—CH$_3$ wherein m is between 10 and 150 and n is between 10 and 150; cyclic polyhydrogenomethylsiloxane with the formula —(O—SiCH$_3$H)$_n$ (wherein n is between 10 and 150); poly(hydrogenomethyl-co-dimethyl)siloxane (PHDMS) cyclic copolymer with the formula (O—Si(CH$_3$)$_2$)$_m$—(O—SiCH$_3$H)$_n$ wherein m is between 10 and 150 and n is between 10 and 150.

In an advantageous embodiment of the present invention, the polysiloxane is notably polyhydrogenomethylsiloxane (PHMS) with the formula CH$_3$—(O—SiCH$_3$H)$_n$—CH$_3$ (wherein n=50).

Advantageously, the polysiloxane may be present in the form of a W/O emulsion which may include, inter alia, surfactants. This may be for example Xiameter® MEM 0075 (CAS: 63148-57-2).

In a particular embodiment:
  the water-soluble organic polymer is obtained by the modification of PVA by undecylenic aldehyde,
  the polysiloxane is PHMS.

As previously specified, the hydrosilylation reaction, possibly between the vinyl function of the PH and the Si—H function of the polysiloxane, is done in the presence of an appropriate catalyst, for example a platinum catalyst.

By way of an appropriate catalyst, one may cite: H$_2$PtCl$_6$; Pt(Et$_2$S)$_2$Cl$_2$; Pt((PhenylCH$_2$)$_2$S)$_2$Cl$_2$; dichloro(dicyclopentadienyl)platinum(II); Karstedt's catalyst (platinum/divinyltetramethyldisiloxane complex); PtO$_2$.

Preferably, the catalyst is a platinum catalyst; more preferably it is Syl-Off® 7924 from Dow Corning, CAS No. 2554-06-5, which is in the form of an emulsion of tetramethyltetravinylcyclotetrasiloxane and platinum in water.

The amount of catalyst to be used depends on the amount of polymer, crosslinking agent (polysiloxane) and experimental conditions. Generally, less than 20% catalyst and preferably between 1 and 11% relative to the weight of the polymer is used.

Advantageously, the catalyst may be in the form of a W/O emulsion which may include, inter alia, surfactants.

Advantageously, the composition used comprises by percent dry weight:
- between 70 and 98% of organic polymer comprising pendant groups with at least one vinyl function, preferably between 80 and 98%,
- between 1 and 20% polysiloxane, preferably between 1 and 11%,
- between 1 and 20% catalyst, preferably between 1 and 11%.

The molar ratio between the hydrogenosiloxane function of the monomer —(O—SiR$^1$H)— and the vinyl function of the organic polymer in the composition is advantageously greater than 1, more advantageously said molar ratio is between 1 and 5 and even more advantageously between 1.5 and 2. This enables good cross-linking of the organic polymer comprising the pendant vinyl groups, as well as good control of the peel strength over time.

Advantageously, the dry basis weight of the composition represents between 1 and 10 g/m$^2$ relative to the surface area of the substrate.

Advantageously, the cellulose fiber-based substrate of the invention is crepe paper. Advantageously, the substrate, notably the type of crepe paper of the invention, has a basis weight between 32 g/m$^2$ and 80 g/m$^2$. Preferably, the type of crepe paper of the invention has an elongation capacity of between 4 and 20%, or even more within the scope of masking tape for curves.

This elongation rate or elongation capacity is particularly advantageous for the application of crepe paper as a masking tape in painting. A good elongation rate allows better handling and shaping of the tape.

According to an alternate embodiment, the substrate is a flat back paper. The term "flat back paper" describes a paper backing which is not creped. These papers are quite flat and smooth when compared to typical creped bases. Also, they have very little elongation (2-4%) when compared to creped grades.

Another object of the invention is a method for producing the cellulose fiber-based substrate, notably crepe paper according to the invention. Said method comprises the steps of:
1) forming a substrate from an aqueous suspension of cellulosic fibers on a conventional paper machine;
2) preparing a composition by mixing in an aqueous medium:
   a) at least one organic polymer comprising pendant groups with at least one vinyl function;
   b) at least one polysiloxane comprising at least one hydrogeno siloxane monomer —(O—SiR$^1$H)—, wherein R$^1$ is a linear or branched (and/or cyclic) hydrocarbon chain which may contain heteroatoms;
   c) at least one hydrosilylation catalyst, advantageously a platinum catalyst;
3) coating at least one side of the substrate with a single layer formed by said composition;
4) drying.

The coating techniques known to those skilled in the art further include the size press, the metering-size press, immersion coating, bar coating, Champion powder coating, air knife coating, scraping knife coating, knife over roll coating, single-layer and multilayer curtain coating, transfer roll coating (reverse roll coating), spray coating, atomized coating, LAS (liquid application system) coating, kiss coating, foam coating and any surface treatment method using coating.

As stated above, the production of crepe paper according to the invention takes place in a single production line, where the crepe paper is prepared from a cellulosic fiber pulp, creped and then coated with the composition according to the invention. Downstream of the paper machine, the coated crepe paper is ready to be coated with adhesive, preferably on a single side, so as to form adhesive tapes, for example masking tapes.

Another object of the invention is also a masking tape comprising a type of crepe paper according to the invention. In practice, the side untreated with the release composition is coated with an adhesive.

The invention and advantages thereof will become more apparent from the following non-limiting examples given to describe the invention.

EMBODIMENTS OF THE INVENTION

I/ 1st Embodiment: Crepe Paper as a Substrate

1: Comparative Test

A sheet of crepe paper for masking tape (Master Tape TM Classic 100) with a basis weight of 39 g/m$^2$ was treated on one side by being coated with an aqueous mixture according to the invention.

Composition of the Mixture (COMPOSITION 1):
Organic polymer=PVA$^1$ (Celvol® 28/99) modified with 5% by weight of undecenal.
Polyhydrogenomethylsiloxane=Xiameter® MEM 0075 at 5% by weight.
Catalyst=Syl-Off® 7924 at 5% by weight.
$^1$PVA modified with undecylenic aldehyde.

Reaction of 100 g PVA and 5 g undecylenic aldehyde in 1 L water at pH=1.5 and T=90° C. for a duration of typically between 45 and 90 minutes. At the end of the reaction, the pH is adjusted to 7 by the addition of soda.

The resulting paper is compared with crepe paper of the same type treated with 10 g/m$^2$ SBR latex (Styron® XZ 97235.00)+4 g/m$^2$ acrylic latex with release properties (Primal® R 550 from Rohm and Haas).

| | Invention: Master tape 100 (39 g/m$^2$) + 10 g/m$^2$ of COMPOSITION 1 | Master tape 100 (39 g/m$^2$) + 10 g/m$^2$ of SBR latex + 4 g/m$^2$ of acrylic release agent |
|---|---|---|
| Basis weight (g/m$^2$) | 49 | 53 |
| Dry MD tensile strength (kN/m) – elongation (%) | 2.89-9% | 2.72-13% |
| Dry CD tensile strength (kN/m) | 1.86 | 1.22 |
| Wet tensile strength (kN/m) | 1.7 | 1.32 |
| Wet tensile strength (kN/m) | 0.75 | 0.5 |
| 60 sec Cobb (g/m$^2$) Cobb test | 19.5 | 12 |

2: Release Comparison Test:

A sheet of 60 g/m$^2$ crepe paper was coated with various aqueous compositions using size press treatment. The dry deposition of these compositions was between 6 and 7 g/m$^2$:

Formulation 2.1:
Polymer=PVA$^1$ (Moviol® 4/98) modified with 1% by weight of undecenal.
Polyhydrogenomethylsiloxane=Xiameter® MEM 0075 at 1% by weight (relative to the weight of PVA).

Catalyst=Syl-Off® 7924 at 1% by weight (relative to the weight of PVA).

Formulation 2.2:
Polymer=PVA[1] (Moviol® 4/98) modified with 2% by weight of undecenal.
Polyhydrogenomethylsiloxane=Xiameter® MEM 0075 at 2% by weight.
Catalyst=Syl-Off® 7924 at 2% by weight.

Formulation 2.5:
PH=PVA[1] (Moviol® 4/98) modified with 5% by weight of undecenal.
Polyhydrogenomethylsiloxane=Xiameter® MEM 0075 at 5% by weight.
Catalyst=Syl-Off® 7924 at 5% by weight.

The FINAT FTM 1 test was applied. This test assesses the adaptation of a release substrate to rolling by using a PSA-type adhesive.

Sample 1: A piece of a commercial masking tape (COTEKA® from Bricomarché, 5 cm width) was applied using a 10 kg roller on the release side of another piece of COTEKA® tape. The peel strengths were measured at a speed of 300 mm/min with an angle of 180°.

Sample 2.1: A piece of commercial masking tape (COTEKA® from Bricomarché, 5 cm width) was applied using a 10 kg roller on the side of a piece of crepe paper coated with the composition of the invention, formulation 2.1.

Sample 2.2: A piece of commercial masking tape (COTEKA® from Bricomarché, 5 cm width) was applied using a 10 kg roller onto the side of a piece of crepe paper coated with the composition of the invention, formulation 2.2.

Sample 2.5: A piece of commercial masking tape (COTEKA® from Bricomarché, 5 cm width) was applied using a 10 kg roller on the side of a piece of crepe paper coated with the composition of the invention, formulation 2.5.

| Standard separation strength | Separation strength (N/5 cm) | | | |
|---|---|---|---|---|
| Sample | 1 | 2 | 3 | Avg |
| Sample 1 (COTEKA ®) | 7.4 | 7.28 | 7.04 | 7.24 |
| Sample 2.1 | 7.98 | 7.88 | 7.76 | 7.87 |
| Sample 2.2 | 6.52 | 5.8 | 6.23 | 6.18 |
| Sample 2.5 | 4.67 | 4.9 | 4.97 | 4.85 |

It was noted that the peel strengths of the invention were on par with those of the commercial product, between 5 and 8 N/5 cm.

3: FINAT FTM 11 Test—Subsequent Adhesion:

The "subsequent adhesion release" is the force required at a given speed and angle to tear a tape coated with an adhesive adhered to a standard test plate, this tape having previously been in contact with the side of a substrate of the same type coated with a release agent, under specific temperature and humidity conditions.

The objective of this test is to measure the possible transfer of the release agent into the adhesive layer.

The percentage of subsequent adhesion is expressed as the ratio between the measured adhesion, compared to the adhesion obtained by a similar control tape which was not in contact with a substrate coated with a release agent. The adhesion value of the control tape was measured as 10.97 N/5 cm.

| | Subsequent separation strength (N/5 cm) | | | | |
|---|---|---|---|---|---|
| Sample | 1 | 2 | 3 | Avg | % Loss |
| Sample 1 (COTEKA ®) | 10.44 | 10.28 | 10.85 | 10.52 | −4.1% |
| Sample 2.1 | 10.67 | 11 | 10.24 | 10.64 | −3% |
| Sample 2.2 | 9.2 | 9.02 | 10.17 | 9.46 | −13.7% |
| Sample 2.5 | 10.1 | 10.13 | 10.63 | 10.29 | −6.2% |

It was therefore noted that the loss of adhesion, following the peel tests, was relatively low, around 4% for the commercial product. The various substrates of the invention have adhesion losses similar to a commercial product (3% for formulation 2.1).

4: Peel Strength After Aging Test Under Pressure (70 g/cm$^2$) at Room Temperature and at 70° C. in Accordance with the FINAT FM 10 Test:

At Room Temperature:

A commercial masking tape (COTEKA® from Bricomarché, 5 cm width) was applied on the different types of crepe paper and COTEKA® tapes using a 10 kg roller under the same conditions as in Example 2. The samples were pressurized (70 g/cm$^2$) at room temperature (23° C. and 50% humidity) for 20 hours. They were then kept for at least 4 hours at 23° C. and 50% humidity. The peel strengths were measured at a speed of 300 mm/min and an angle of 180°, FINAT FM1 test.

| Separation strength after aging at room temperature | Separation strength (N/5 cm) | | | | % Loss/ Gain |
|---|---|---|---|---|---|
| Sample | 1 | 2 | 3 | Avg | |
| Sample 1 (COTEKA ®) | 7.12 | 7.23 | 6.88 | 7.08 | −2.26 |
| Sample 2.1 | 7.55 | 7.42 | 7.63 | 7.53 | −4.32 |
| Sample 2.2 | 6.51 | 6.68 | 6.13 | 6.44 | 4.15 |
| Sample 2.5 | 4.58 | 4.68 | 4.69 | 4.65 | −4.06 |

The values were compared with the values of Example 2 Separation strength before the aging test). It was noted that, for both the commercial product and the substrates of the invention, the change in the strength was low (between a loss of 4% and a gain of 4%) and therefore the peel strengths were stable over time under pressure at room temperature.

At 70° C.

A commercial masking tape (COTEKA® from Bricomarché, 5 cm width) was applied on the different types of crepe paper and COTEKA® tapes using a 10 kg roller under the same conditions as in Example 2. The samples were pressurized (70 g/cm$^2$) at a temperature of 70° C. for 20 hours. They were then kept for at least 4 hours at 23° C. and 50% humidity. The peel strengths were measured at a speed of 300 mm/min and an angle of 180°, FINAT FM1 test.

| Separation strength after aging at a temperature of 70° C. | Separation strength (N/5 cm) | | | | % Loss/ Gain |
|---|---|---|---|---|---|
| Sample | 1 | 2 | 3 | Avg | |
| Sample 1 (COTEKA ®) | 8.4 | 7.89 | 8.49 | 8.26 | 14.09 |
| Sample 2.1 | 9.09 | 9.68 | 8.49 | 9.09 | 15.41 |
| Sample 2.2 | 8.87 | 7.94 | 9.39 | 8.73 | 41.24 |
| Sample 2.5 | 6.88 | 7.19 | 6.91 | 6.99 | 44.29 |

The values were compared with the values of Example 2 (Separation strength before the aging test). It was noted that for both the commercial product and one of the substrates of the invention, there was a slight increase in the peel strength of around 15%. The two other examples of the invention had a slightly greater increase in peel strength (around 40%) but with peel values specific to masking tape (between 5 and 8 N/5 cm).

5: FINAT FTM 11 Test-Subsequent Adhesion After Aging at Room Temperature and at 70° C. (See FINAT FTM 11):

The "subsequent adhesion release" is the force required at a given speed and angle to tear a tape coated with an adhesive adhered to a standard test plate, this tape having previously been in contact with the side of a substrate of the same type coated with a release agent, under specific temperature and humidity conditions.

The percentage of subsequent adhesion is expressed as the ratio between the measured adhesion compared with the adhesion obtained by a similar control tape which was not in contact with a substrate coated with a release agent. The adhesion value of the control tape was measured as 10.97 N/5 cm.

At Room Temperature:

| Aging at room temperature | Subsequent separation strength (N/5 cm) | | | | |
|---|---|---|---|---|---|
| Sample | 1 | 2 | 3 | Avg | % Loss |
| Sample 1 (COTEKA ®) | 10.24 | 10.58 | 9.25 | 10.02 | −8.7% |
| Sample 2.1 | 9.73 | 9.57 | 10.64 | 9.98 | −9% |
| Sample 2.2 | 10.19 | 9.8 | 8.66 | 9.55 | −12.9% |
| Sample 2.5 | 10.52 | 9.88 | 9.77 | 10.06 | −8.3% |

The loss of adhesion following aging under pressure at room temperature remained low, at around 10%, with similar values for the commercial product and the substrates related to the invention.

At 70° C.:

| Aging at 70° C. | Subsequent separation strength (N/5 cm) | | | | |
|---|---|---|---|---|---|
| Sample | 1 | 2 | 3 | Avg | % Loss |
| Sample 1 (COTEKA ®) | 9.86 | 9.51 | 9.9 | 9.76 | −11% |
| Sample 2.1 | 9.93 | 10.29 | 9.8 | 10.01 | −8.7% |
| Sample 2.2 | 10.35 | 8.79 | 9.21 | 9.45 | −13.8% |
| Sample 2.5 | 9.52 | 8.97 | 9.03 | 9.17 | −16.4% |

The loss of adhesion following aging under pressure at 70° C. remained low, at around 10%, with similar values for the commercial product and the 10 substrates related to the invention, notably formulation 2.1.

6: Peel Strength After Aging (7 Days) at High Temperature (65° C.) and High Humidity (85% Relative Humidity)-AFERA #4003 (EN 12024) Test:

Samples relating to formulations 2.1, 2.2 and 2.5 of the invention were complexed with commercial masking tape (COTEKA® from Bricomarché) and conditioned for one week at 65° C. and 85% relative humidity. The commercial tape (COTEKA®) was complexed in a similar way to itself and kept for one week at 65° C. and 85% relative humidity. The peel strengths were measured afterwards for at least 4 hours in a conditioning room (23° C. and 50% relative humidity) and compared with the initial peel strengths.

| Sample (peel strength: N/5 cm) | Initial peel strength | Peel strength after aging | % Change |
|---|---|---|---|
| Sample 1 (COTEKA ®) | 7.24 | 9.99 | +38% |
| Sample 2.1 | 7.87 | 8.82 | +12% |
| Sample 2.2 | 6.18 | 8.22 | +33% |
| Sample 2.5 | 4.85 | 6.42 | +32% |

It was noted that the change in the peel strength remained low for formulation 2.1 of the invention (+12%). The two other formulations had slightly greater increases (of around 30%), but their peel values remained in the range of values for masking tapes, i.e. between 5 and 8 N/5 cm. It was noted that the commercial sample had greater instability than the substrates of the invention vis-a-vis the aging test under high humidity: +38%.

7: Release Properties of a Polymer Within the Aqueous Dispersion of the Invention:

Composition of the Mixture: Formulation 3
82% by weight SBR DL 950 latex from Styron® (Glass-transition temperature: 2° C.)
9% by weight polysiloxane: Xiameter® MEM 0075
9% by weight Catalyst Syl-Off® 7924

This formulation was coated onto crepe paper and given that its measured peel strength was 1.78 N/5 cm exhibits release properties, whereas a substrate coated with only SBR latex has a high release strength at around 11.65 N/5 cm, which does not correspond to release values of commercial masking tape. Formulation 3, meanwhile, could be formulated in order to achieve targeted values of between 5 and 8 N/5 cm.

II/ $2^d$ Embodiment: Flat Back Paper as a Substrate

Release Test:

A sheet of 62 g/m² flat back paper (AHLSTROM Mastertape™ Delicate 400—62 g/m²) was coated with aqueous compositions using size press treatment. The dry deposition of this composition was between 6 and 7 g/m²:

Formulation 4:
Polymer=PVA[1] (Moviol® 4/98) modified with 3% by weight of undecenal.
Polyhydrogenomethylsiloxane=Wacker Crosslinker V6-88, 7.5% by dry weight (relative to the dry weight of PVA).
Catalyst=Wacker Catalyst Emulsion JB7, 5.5% by dry weight (relative to the dry weight of PVA).

The FINAT FTM 1 test was applied. This test assesses the adaptation of a release substrate to rolling by using a PSA-type adhesive.

Sample 1: A piece of a commercial masking tape (COTEKA® from Bricomarché, 5 cm width) was applied using a 10 kg roller on the release side of another piece of COTEKA® tape. The peel strengths were measured at a speed of 300 mm/min with an angle of 180°.

Sample 4: A piece of a commercial masking tape (COTEKA® from Bricomarché, 5 cm width) was applied using a 10 kg roller on the side of a piece of flat back paper coated with the composition of the invention, formulation 3.

| Standard separation strength | Separation strength (N/5 cm) | | | |
|---|---|---|---|---|
| Sample | 1 | 2 | 3 | Avg |
| Sample 1 (COTEKA ®) | 7.4 | 7.28 | 7.04 | 7.24 |
| Sample 4 | 4.96 | 5.21 | 5.17 | 5.11 |

It was noted that the peel strengths of the invention were on par with those of the commercial product, between 5 and 8 N/5 cm.

The invention claimed is:

1. A cellulosic fiber-based adhesive tape substrate, wherein at least one side of the substrate is directly coated with a single layer comprising an aqueous mixture of:
   a) at least one organic polymer comprising pendant groups with at least one vinyl function, wherin the organic polymer comprises polyvinyl alcohol;
   b) at least one polysiloxane comprising at least one hydrogen siloxane monomer —(O—SiR1H)—, wherein R1 is a linear or branched and/or cyclic hydrocarbon chain optionally containing heteroatoms; and
   c) at least one hydrosilylation catalyst;
   wherein the at least one polysiloxane cross-links the polyvinyl alcohol via the at least one vinyl function without or prior to any subsequent coating step.

2. The substrate according to claim 1, wherein at least some of the polyvinyl alcohol is reacted by acetylation and/or hemiacetylation with at least one organic molecule (OM1) comprising at least one aldehyde function and at least one vinyl function, and/or
   at least some of the polyvinyl alcohol is reacted with at least one organic molecule (OM2) comprising at least one epoxy function and at least one vinyl function.

3. The substrate according to claim 2, wherein:
   the molecule OM1 is a molecule with the formula HCO—$(R^2)$—CH=CH2, wherein $R^2$ is a linear and/or cyclic hydrocarbon chain, which optionally contains at least one heteroatom (X); and
   the molecule OM2 is a molecule having the formula $H_2C$—O—CH—$(R^3)$—CH=CH2, wherein $R^3$ is a linear, branched and/or cyclic hydrocarbon chain —$(C)_x$—, which optionally contains at least one heteroatom (X).

4. The substrate according to claim 1, wherein the polysiloxane is selected from the group consisting of polyhydrogenmethylsiloxane (PHMS); poly(hydrogenmethyl-co-dimethyl) siloxane (PHDMS) copolymer; cyclic-polyhydrogenomethylsiloxane; and cyclic poly(hydrogenomethyl-co-dimethyl) siloxane (PHDMS) copolymer.

5. The substrate according to claim 1, wherein:
   the organic polymer is obtained through the modification of polyvinyl alcohol (PVA) by undecylenic aldehyde, and
   the polysiloxane is polyhydrogenomethylsiloxane (PHMS).

6. The substrate according to claim 1, wherein the single layer by percent dry weight:
   between 70 and 98% of the organic polymer,
   between 1 and 20% of the polysiloxane,
   between 1 and 20% of the catalyst, and wherein
   the single layer has a ratio of Si—H of the polysiloxane to vinyl functional groups of the organic polymer of between 1 and 5.

7. The substrate according to claim 6, wherein the single layer comprises by percent dry weight:
   between 80 and 98% of the organic polymer,
   between 1 and 11% of the polysiloxane,
   between 1 and 11% of the catalyst, and wherein
   a ratio of Si—H of the polysiloxane to vinyl functional groups of the organic polymer of between 1 and 5.

8. The substrate according to claim 1, wherein the composition has a dry basis weight of between 1 and 10 $g/m^2$ relative to a surface area of the substrate.

9. The substrate according to claim 1, wherein the catalyst is platinum based.

10. The substrate according to claim 1, wherein the substrate is crepe paper.

11. A masking tape which comprises the cellulosic-fiber based substrate according to claim 1.

12. A cellulosic fiber-based adhesive tape substrate comprising:
   a coating on a surface thereof, the coating consisting essentially of a cross-linked polyvinylalcohol comprising pendant groups with at least one vinyl function, wherein the polyvinylalcohol is cross-linked by hydrosilylation with at least one polysiloxane comprising at least one hydrogen siloxane monomer —(O—SiR1H)—, and wherein R1 is a linear or branched and/or cyclic hydrocarbon chain optionally containing heteroatoms.

13. A cellulosic fiber-based adhesive tape substrate comprising:
   a coating on a surface thereof, the coating consisting essentially of a cross-linked polyvinylalcohol comprising pendant groups with at least one vinyl function and at least one hydrosilylation catalyst, wherein the polyvinylalcohol is cross-linked with at least one polysiloxane comprising at least one hydrogen siloxane monomer —(O—SiR1H)—, and wherein R1 is a linear or branched and/or cyclic hydrocarbon chain optionally containing heteroatoms.

14. A method to produce the cellulosic-fiber based substrate comprising:
   1) forming a substrate from an aqueous suspension of cellulosic fibers on a paper machine;
   2) preparing a composition by mixing in an aqueous medium:
      a) at least one organic polymer comprising pendant groups with at least one vinyl function, wherein the organic polymer comprising polyvinyl alcohol;
      b) at least one polysiloxane comprising the at least one hydrogen siloxane monomer —(O—SiR1H)—, wherein $R^1$ is a linear or branched and/or cyclic hydrocarbon chain which may contain heteroatoms; and
      c) least one hydrosilylation catalyst;
   3) coating a single layer of the composition onto at least one side of the substrate, wherein the at least one polysiloxane cross-links the polyvinyl alcohol via the at least one vinyl function without or prior to any subsequent coating steps; and
   4) drying the single layer of the composition coated onto the at least one side of the substrate.

* * * * *